US008426518B2

(12) United States Patent
Kato et al.

(10) Patent No.: US 8,426,518 B2
(45) Date of Patent: Apr. 23, 2013

(54) DISPERSION STABILIZER

(75) Inventors: Masaki Kato, Kurashiki (JP); Shinsuke Nii, Kurashiki (JP); Yasutomo Saitou, Kurashiki (JP); Masato Nakamae, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 758 days.

(21) Appl. No.: 12/295,352

(22) PCT Filed: Apr. 11, 2007

(86) PCT No.: PCT/JP2007/057950
§ 371 (c)(1),
(2), (4) Date: Sep. 30, 2008

(87) PCT Pub. No.: WO2007/119735
PCT Pub. Date: Oct. 25, 2007

(65) Prior Publication Data
US 2009/0111940 A1 Apr. 30, 2009

(30) Foreign Application Priority Data

Apr. 12, 2006 (JP) .................. 2006-109754
Apr. 12, 2006 (JP) .................. 2006-109755

(51) Int. Cl.
*C08F 16/06* (2006.01)
*C08F 2/16* (2006.01)

(52) U.S. Cl.
USPC ........................................ 525/60; 524/459

(58) Field of Classification Search ............ 524/60
See application file for complete search history.

(56) References Cited

U.S. PATENT DOCUMENTS

| | | | |
|---|---|---|---|
| 2,759,909 | A | 8/1956 | Hiatt et al. |
| 3,148,166 | A | 9/1964 | Suzumura et al. |
| 4,456,731 | A | 6/1984 | Caporossi et al. |
| 4,540,743 | A | 9/1985 | Schulz et al. |
| 4,915,974 | A * | 4/1990 | D'Amelia et al. ........... 426/611 |
| 5,830,953 | A | 11/1998 | Nishikawa et al. |
| 6,635,709 | B2 | 10/2003 | Kato et al. |
| 6,806,305 | B2 | 10/2004 | Kato et al. |
| 7,070,731 | B2 | 7/2006 | Kato et al. |
| 2006/0180956 | A1 | 8/2006 | Kato et al. |

FOREIGN PATENT DOCUMENTS

| | | |
|---|---|---|
| GB | 1 396 355 | 6/1975 |
| JP | 51-45189 | 4/1976 |
| JP | 55-29579 | 3/1980 |
| JP | 55 29579 | 3/1980 |
| JP | 57 162703 | 10/1982 |
| JP | 60 13803 | 1/1985 |
| JP | 2 268660 | 11/1990 |
| JP | 7 173219 | 7/1995 |
| JP | 7-173219 | 7/1995 |
| JP | 07173219 A * | 7/1995 |
| JP | 8-259609 | 10/1996 |
| JP | 8-283313 | 10/1996 |
| JP | 10-67806 | 3/1998 |
| JP | 2000 239317 | 9/2000 |
| JP | 2000-239317 | 9/2000 |
| JP | 2000-273122 | 10/2000 |
| JP | 2000 273122 | 10/2000 |
| JP | 2001-288214 | 10/2001 |
| JP | 2001 288214 | 10/2001 |
| JP | 2004-250695 | 9/2004 |
| JP | 2007-63383 | 3/2007 |
| JP | 2007 63383 | 3/2007 |

OTHER PUBLICATIONS

Translation of JP07173219, Jul. 1995.*
U.S. Appl. No. 12/999,020, filed Dec. 14, 2010, Kato, et al.
U.S. Appl. No. 12/999,147, filed Dec. 15, 2010, Kato, et al.
U.S. Appl. No. 12/999,346, filed Dec. 16, 2010, Kato, et al.
U.S. Appl. No. 12/999,167, filed Dec. 15, 2010, Kato, et al.
G. Menecke, et al., "Immobilisierung von Corynebakterium simplex durch Photovernetzung von vinyliertem Polyvinylalkohol zur mikrobiologischen Steroidumwandlung", *Die Angewandte Makromolekulare Chemie*, vol. 113, No. 1, pp. 179-202, 1983 (w/English summary).
A. Ühlebach, et al., "New Water-Soluble Photo Crosslinkable Polymers Based on Modified Poly(vinyl alcohol)", *Journal of Polymer Science: Part A: Polymer Chemistry*, vol. 35, pp. 3603-3611, 1997.
U.S. Appl. No. 13/123,386, filed Apr. 8, 2011, Kato, et al.
Office Action issued Oct. 22, 2010, in European Patent Application No. 07 741 386.2-1214.
U.S. Appl. No. 12/595,047, filed Oct. 8, 2009, Kato, et al.

* cited by examiner

*Primary Examiner* — Hui Chin
(74) *Attorney, Agent, or Firm* — Oblon, Spivak, McClelland, Maier & Neustadt, L.L.P.

(57) ABSTRACT

The aforementioned problems can be solved by a dispersion stabilizer composed of a polyvinyl alcohol polymer (B) having a double bond in its side chain. The polyvinyl alcohol polymer (B) is obtained by esterifying a polyvinyl alcohol polymer (A) with a carboxylic acid having an unsaturated double bond or a salt thereof. Furthermore, the aforementioned problems can be solved with a dispersion stabilizer composed of a carboxylic acid-modified polyvinyl alcohol polymer (C) that is obtained by esterifying a polyvinyl alcohol polymer (A) with aliphatic carboxylic acid and/or aromatic carboxylic acid containing no olefinically unsaturated bond in the molecule or a salt thereof.

18 Claims, No Drawings

DISPERSION STABILIZER

BACKGROUND OF THE INVENTION

1. Field of the Invention

The present invention relates to dispersion stabilizers to be used for suspension polymerization or emulsion polymerization. More particularly, the present invention relates to dispersion stabilizers having excellent polymerization stability when being used for suspension polymerization or emulsion polymerization of a vinyl compound.

2. Description of the Related Art

Conventionally, polyvinyl alcohol polymers are used widely as dispersion stabilizers for suspension polymerization and emulsion polymerization of vinyl compounds. Particularly, they are useful for suspension polymerization for a polyvinyl chloride resin (hereinafter, may be abbreviated as "PVC resin").

Since a PVC resin is excellent not only in, for example, chemical resistance and electrical insulation properties but also in processability and can be either hard or soft, it is used as various molding materials in a wide range of applications.

Generally, the PVC resin is manufactured on an industrial scale by a suspension polymerization method in which monomers of, for example, vinyl chloride (hereinafter, a vinyl chloride type monomer may be abbreviated as vinyl chloride) are polymerized in the presence of a dispersion stabilizer in an aqueous medium using an oil soluble polymerization initiator.

Examples of the factors that control the quality of the PVC resin when the PVC resin is manufactured by the suspension polymerization method include the rate of polymerization of the PVC resin, the ratio between water and vinyl chloride in a polymerization reaction system, polymerization temperature, the type and amount of polymerization initiator, the type of polymerization tank, the rate of stirring of a polymerization reaction solution, and the type of dispersion stabilizer. Among these, the type of dispersion stabilizer has a considerable effect.

In many cases, polyvinyl alcohol (hereinafter, may be abbreviated as "PVA") is used preferentially as a dispersion stabilizer that is used for suspension polymerization of vinyl chloride (Patent Documents 1 to 4). For the purpose of improving the stability (polymerization stability) during polymerization of vinyl chloride, it has been proposed to use heat-treated PVA for a polymerization reaction (Patent Documents 1 to 3). However, when those conventional dispersion stabilizers are used to carry out the suspension polymerization of vinyl chloride, a satisfactory effect is not always obtained in terms of the polymerization stability.

[Patent Document 1] JP 51(1976)-45189 A
[Patent Document 2] JP 10(1998)-67806 A
[Patent Document 3] JP 2004-250695 A
[Patent Document 4] JP 8(1996)-259609 A On the other hand, PVA also is heavily-used as a dispersant for emulsion polymerization of unsaturated monomers. PVAs used in general are so called "completely saponified PVA" with a saponification degree of about 98 mol % and "partially saponified PVA" with a saponification degree of about 88 mol %. In the case where the former is used as the dispersion stabilizer, a comparatively good unsaturated polymer is obtained in terms of water resistance and fluidity (high-speed coating properties). However, since the surface activity of the dispersion stabilizer itself is low, there are problems in that the viscosity of an aqueous medium increases at low temperatures and gelation occurs that makes it difficult to perform emulsion polymerization itself. On the other hand, in the case where the latter is used as the dispersion stabilizer, although the problems are solved including an increase in viscosity at low temperatures of the aqueous medium and occurrence of gelation, there is a problem in that the resultant unsaturated polymer is inferior in terms of water resistance. In order to solve such problems, both PVAs are used in combination or a PVA with a saponification degree inbetween the two is used. In the current situation, however, satisfying both the stability during polymerization and the water resistance of an unsaturated polymer at the same time has not yet been achieved.

SUMMARY OF THE INVENTION

The present invention is intended to provide a dispersion stabilizer that has excellent polymerization stability when being used for suspension polymerization or emulsion polymerization.

As a result of keen studies made assiduously, the present inventors have found that the aforementioned problems can be solved with a dispersion stabilizer composed of a polyvinyl alcohol polymer (B) that has a double bond in its side chain and that is obtained by esterifying a polyvinyl alcohol polymer (A) with a carboxylic acid having an unsaturated double bond or a salt thereof. Furthermore, they also have found that the aforementioned problems can be solved with a dispersion stabilizer composed of a carboxylic acid-modified polyvinyl alcohol polymer (C) that is obtained by esterifying a polyvinyl alcohol polymer (A) with an aliphatic carboxylic acid and/or aromatic carboxylic acid containing no olefinically unsaturated bond in the molecule or a salt thereof. Thus, the present invention was completed.

When the dispersion stabilizer of the present invention is used for suspension polymerization of, for example, vinyl chloride, the vinyl chloride can be polymerized stably. This makes it possible to obtain excellent effects that scale adhesion and blocking caused by polymerization instability are reduced. Furthermore, polymer particles can be obtained that include less coarse particles and have a sharp particle size distribution. Similarly, when the dispersion stabilizer of the present invention is used for emulsion polymerization of unsaturated monomers, the polymerization of the unsaturated monomers can be performed stably and an excellent effect that the amount of filtration residue of the resultant polymer is small can be obtained.

BEST MODE FOR CARRYING OUT THE INVENTION

Examples of the carboxylic acid having an unsaturated double bond that is used in the present invention include: unsaturated monocarboxylic acids such as acrylic acid, methacrylic acid, crotonic acid, isocrotonic acid, propynoic acid, 2-pentenoic acid, 4-pentenoic acid, 2-heptenoic acid, 2-octenoic acid, cinnamic acid, myristoleic acid, palmitoleic acid, oleic acid, elaidic acid, vaccenic acid, gadoleic acid, erucic acid, nervonic acid, linoleic acid, linolenic acid, eleostearic acid, stearidonic acid, arachidonic acid, eicosapentaenoic acid, clupanodonic acid, docosahexaenoic acid, and sorbic acid; unsaturated dicarboxylic acids such as maleic acid, fumaric acid, itaconic acid, citraconic acid, and mesaconic acid; unsaturated carboxylic acid anhydrides such as maleic anhydride, fumaric anhydride, itaconic anhydride, and citraconic anhydride; unsaturated carboxylic acid alkyl esters such as acrylic acid alkyl ester, methacrylic acid alkyl ester, and crotonic acid alkyl ester; unsaturated dicarboxylic acid monoesters such as maleic acid monoalkyl ester, fumaric acid monoalkyl ester, and itaconic acid monoalkyl ester; and unsaturated dicarboxylic acid diesters such as maleic acid dialkyl ester, fumaric acid dialkyl ester, and itaconic acid dialkyl ester. These carboxylic acids also can be used as salts thereof. The carboxylic acids or salts thereof can be used independently, or two or more of them can be used in combination.

Examples of aliphatic carboxylic acids containing no olefinically unsaturated bond in the molecule that are used in another present invention include: aliphatic monocarboxylic acids such as formic acid, acetic acid, propionic acid, butyric acid, valeric acid, caproic acid, caprylic acid, capric acid, lauric acid, myristic acid, palmitic acid, stearic acid, cyclohexane carboxylic acid, acetoacetic acid, glycolic acid, lactic acid, and ascorbic acid; aliphatic dicarboxylic acids such as oxalic acid, malonic acid, succinic acid, glutaric acid, adipic acid, pimelic acid, suberic acid, azelaic acid, sebacic acid, tartaric acid, and malic acid; and aliphatic tricarboxylic acids such as citric acid.

Furthermore, examples of aromatic carboxylic acids containing no olefinically unsaturated bond in the molecule include: aromatic monocarboxylic acids such as phenylacetic acid, benzoic acid, toluic acid, and salicylic acid; and aromatic dicarboxylic acids such as phthalic acid, isophthalic acid, terephthalic acid, and p-hydroxybenzoic acid.

These aliphatic carboxylic acids and/or aromatic carboxylic acids also can be used as salts thereof. Among these, particularly aliphatic carboxylic acids and/or aromatic carboxylic acids having at least two carboxyl groups in the molecule or salts thereof are preferable. The aliphatic carboxylic acids and/or aromatic carboxylic acids or salts thereof can be used independently, or two or more of them can be used in combination.

When a PVA polymer (B) having a double bond in its side chain or carboxylic acid-modified PVA polymer (C) that is obtained by esterifying a polyvinyl alcohol polymer (hereinafter, the polyvinyl alcohol polymer may be abbreviated as "PVA polymer") (A) is used as a dispersion stabilizer for suspension polymerization, the saponification degree of the PVA polymer (A) is preferably at least 60 mol % and more preferably at least 70 mol %. The upper limit of the saponification degree is not particularly limited.

Furthermore, when the PVA polymer (B) having a double bond in its side chain or carboxylic acid-modified PVA polymer (C) that is obtained by esterifying the PVA polymer (A) is used as a dispersion stabilizer for emulsion polymerization, the saponification degree of the PVA polymer (A) is preferably at least 50 mol %, more preferably at least 70 mol %, further preferably at least 80 mol %, and particularly preferably at least 83 mol %. The upper limit of the saponification degree is not particularly limited.

Moreover, the polymerization degree of the PVA polymer (A) is not particularly limited but is preferably 100 to 8000, more preferably 200 to 3000, and further preferably 250 to 2500.

In the present invention, the vinyl ester polymer that is used as a material for manufacturing the PVA polymer (A) can be manufactured by polymerizing vinyl ester monomers using a conventionally known method such as a bulk polymerization method, a solution polymerization method, a suspension polymerization method, an emulsion polymerization method, or a dispersion polymerization method. From the industrial viewpoint, preferable polymerization methods are the solution polymerization method, the emulsion polymerization method, and the dispersion polymerization method. For a polymerization operation, it is possible to employ any polymerization method selected from the batch method, the semi-batch method, and the continuous method.

Examples of the vinyl ester monomers that can be used for polymerization include vinyl acetate, vinyl formate, vinyl propionate, vinyl caprylate, and vinyl versatate. Among these, the vinyl acetate is preferable from the industrial viewpoint.

In polymerization of the vinyl ester monomers, the vinyl ester monomers can be copolymerized with other monomers, as long as it is in the range in which the spirit of the present invention is not impaired. Examples of the monomers that can be use include: alpha-olefins such as ethylene, propylene, n-butene, and isobutylene; acrylic acid and a salt thereof, acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and a salt thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, acrylamide derivatives such as N-methylacrylamide, N-ethylacrylamide, N,N-dimethylacrylamide, diacetone acrylamide, acrylamide propanesulfonic acid and a salt thereof, acrylamide propyldimethylamine and a salt thereof or quaternary salt thereof, and N-methylolacrylamide and derivatives thereof, methacrylamide, methacrylamide derivatives such as N-methylmethacrylamide, N-ethylmethacrylamide, methacrylamide propanesulfonic acid and a salt thereof, methacrylamide propyldimethylamine and a salt thereof or quaternary salt thereof, and N-methylolmethacrylamide and derivatives thereof, vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate and allyl chloride; unsaturated dicarboxylic acids such as maleic acid, itaconic acid, and fumaric acid, and salts thereof or esters thereof, vinylsilyl compounds such as vinyltrimethoxysilane; and isopropenyl acetate.

Furthermore, in polymerization of vinyl ester monomers, a chain transfer agent can be present together for the purposes of, for example, adjusting the polymerization degree of the vinyl ester polymer to be obtained. Examples of the chain transfer agent include: aldehydes such as acetaldehyde, propionaldehyde, butyraldehyde, and benzaldehyde; ketones such as acetone, methyl ethyl ketone, hexanone, and cyclohexanone; mercaptans such as 2-hydroxyethanethiol and dodecyl mercaptan; and halogenated hydrocarbons such as trichloroethylene and perchloroethylene. Particularly, aldehydes and ketones are used suitably. The amount of the chain transfer agent to be added is determined according to the chain transfer constant of the chain transfer agent to be added and the target polymerization degree of the vinyl ester polymer. Generally, the amount is desirably 0.1 to 10 wt % with respect to the vinyl ester monomers.

In the present invention, a PVA polymer that has a large content of 1,2-glycol bonds and that can be obtained through saponification of a vinyl ester polymer obtained by polymerizing vinyl ester monomers under a higher temperature condition than usual also can be used preferably. In this case, the content of 1,2-glycol bonds is not particularly limited but is preferably at least 1.9 mol %, more preferably at least 2.0 mol %, and further preferably at least 2.1 mol %.

An alcoholysis or hydrolysis reaction that is carried out using a conventionally known basic catalyst such as sodium hydroxide, potassium hydroxide, or sodium methoxide, or an conventionally known acidic catalyst such as p-toluenesulfonic acid can be used for the saponification reaction of a vinyl ester polymer. Examples of the solvent that is used for the saponification reaction include: alcohols such as methanol and ethanol; esters such as methyl acetate and ethyl acetate; ketones such as acetone and methyl ethyl ketone; and aromatic hydrocarbons such as benzene and toluene. These can be used independently, or two or more of them can be used in combination. Particularly, it is easy and preferable to use methanol or a mixed solution of methanol and methyl acetate as the solvent and carry out the saponification reaction in the presence of sodium hydroxide that serves as a basic catalyst.

The PVA polymer (A) that is used in the present invention may have ionic functional groups at the end thereof. Examples of these ionic functional groups include a carboxyl group and a sulfonic acid group. Particularly, the carboxyl group is preferable. Those ionic groups also include salts thereof, and an alkali metal salt is preferable from the viewpoint that the PVA polymer (A) is preferably water dispersible. The method of introducing ionic functional groups into the end portion of the PVA polymer can be, for example, a method in which vinyl ester monomers such as vinyl acetate are polymerized in the presence of a thiol compound such as thiolacetic acid, mercaptopropionic acid, or 3-mercapto-1-propanesulfonic acid sodium salt, and the polymer thus obtained is saponified.

In the present invention, there is no particular limitation with respect to the method for esterifying the PVA polymer (A) with a carboxylic acid having an unsaturated double bond or a salt thereof or aliphatic carboxylic acid or aromatic carboxylic acid that contains no olefinically unsaturated bond in the molecule or a salt thereof (hereinafter these also may be abbreviated simply as "carboxylic acid (or a salt thereof)"). Examples of the method include: (i) a method in which the PVA polymer (A) is allowed to react with carboxylic acid or a salt thereof in an anhydrous solvent in the suspended state; (ii) a method in which carboxylic acid or a salt thereof that is in the powdered state or that has been dissolved or dispersed in water or alcohol such as methanol, ethanol, or propanol is mixed with the PVA polymer (A) in the slurry state or the powdered state, which is then heat-treated under a nitrogen or air atmosphere to be reacted; (iii) a method in which a PVA polymer (A) obtained by adding carboxylic acid or a salt thereof to polyvinyl acetate in the paste state and saponifying it is heat-treated; and (iv) a method in which a PVA polymer (A) and carboxylic acid or a salt thereof are dry-blended with, for example, a ribbon Brabender, a V-type Brabender, or a Henschel mixer, which is then melted and kneaded using, for example, a Banbury mixer, a mixing roll, a single or twin screw extruder, and a kneader. Among these, preferable methods are the method (ii) in which the PVA polymer (A) and carboxylic acid or a salt thereof are mixed, which is then heat-treated under a nitrogen atmosphere to be reacted and the method (iv) in which the PVA polymer (A) and carboxylic acid or a salt thereof are melted and kneaded.

In the above-mentioned method (ii), the conditions for heat-treating the mixture of the PVA polymer (A) and carboxylic acid or a salt thereof are not particularly limited. However, the heat treatment temperature is preferably 60 to 190° C., more preferably 65 to 185° C., and further preferably 70 to 180° C. Furthermore, the heat treatment time is preferably 0.5 to 20 hours, more preferably 1 to 18 hours, and further preferably 1 to 16 hours.

In the aforementioned method (iv), the temperature to be employed for melting and mixing the PVA polymer (A) and carboxylic acid or a salt thereof is preferably 130 to 250° C. and more preferably 140 to 220° C. The period of time for which the PVA polymer (A) and carboxylic acid or a salt thereof are retained inside the apparatus used for melting and kneading them is preferably 1 to 15 minutes and more preferably 2 to 10 minutes.

When the PVA polymer (A) and carboxylic acid or a salt thereof are heat-treated, a plasticizer that is used generally for PVA can be mixed to prevent coloring caused by the decomposition of PVA or formation of polyene in the main chain of PVA, and this also makes it possible to decrease the heat treatment temperature. Examples of the plasticizer include: polyhydric alcohols such as glycerol, diglycerol, polyethyleneglycol, polypropylene glycol, and sorbitol; compounds obtained by addition of ethylene oxide to those alcohols; water; saccharides; polyethers; and amide compounds. One of these can be used, or two or more of them can be used in combination. The amount of those plasticizers to be used is generally 1 to 300 parts by weight, more preferably 1 to 200 parts by weight, and further preferably 1 to 100 parts by weight with respect to 100 parts by weight of the PVA polymer.

When the PVA polymer (A) and carboxylic acid having an unsaturated double bond or a salt thereof are heat-treated, it also is possible to heat-treat them with a polymerization inhibitor mixed thereinto in order to prevent a gel from being formed through thermal polymerization of the PVA polymer (A) or carboxylic acid having an unsaturated double bond or a salt thereof during the heat treatment. Examples of the polymerization inhibitor include phenolic polymerization inhibitors such as hydroquinone and hydroquinone monomethyl ether, phenothiazine, and N,N-diphenyl-p-phenylenediamine. The amount of the polymerization inhibitor to be mixed is preferably 0.00001 to 10 parts by weight and more preferably 0.0001 to 1 part by weight with respect to 100 parts by weight of the PVA polymer.

Furthermore, when the PVA polymer (A) and carboxylic acid or a salt thereof are heat-treated, it is preferable that alkali metal ions be contained at a ratio of 0.003 to 3 wt % with respect to 100 parts by weight of the PVA polymer (A), because in this case, for example, thermal degradation, pyrolysis, gelation, and coloring of the PVA polymer (A) can be prevented from occurring. Examples of the alkali metal ions include potassium ions, sodium ions, and magnesium ions. They are mainly present as a salt of lower fatty acid such as acetic acid or propionic acid. When the PVA polymer (A) has a carboxyl group and a sulfonic acid group, they are present as salts of these functional groups. The content of the alkali metal ions in the PVA polymer can be measured by the atomic absorption method.

In the present invention, in order to promote esterification of the PVA polymer (A) with carboxylic acid or a salt thereof, it also is possible to heat-treat the PVA polymer (A) and carboxylic acid having an unsaturated double bond or a salt thereof, with an acid substance or basic substance to serve as a catalyst being mixed therewith. Examples of the acid substance include inorganic acids such as hydrochloric acid, sulfuric acid, nitric acid, and phosphoric acid; organic acids such as formic acid, acetic acid, oxalic acid, and p-toluenesulfonic acid; salts such as pyridinium p-toluenesulfonate and ammonium chloride; and Lewis acids such as zinc chloride, aluminum chloride, iron(III) chloride, tin(II) chloride, tin(IV) chloride, and a boron trifluoride diethylether complex. One of these can be used, or two or more of them can be used in combination. Furthermore, examples of the basic substance include alkali metal hydroxides such as sodium hydroxide and potassium hydroxide; alkali metal carbonates such as sodium carbonate and potassium carbonate; metal oxides such as barium oxide and silver oxide; alkali metal hydrides such as sodium hydride and potassium hydride; alkali metal alkoxides such as sodium methoxide and sodium ethoxide; and alkali metal amides such as sodium amide and potassium amide. One of these can be used, or two or more of them can be used in combination. Generally, the amount of such an acid substance and basic substance to be mixed is preferably 0.0001 to 5 parts by weight with respect to 100 parts by weight of the PVA polymer.

In the present invention, the PVA polymer (A) may be used independently, or two or more PVA polymers (A) whose properties are different from each other may be used in combination.

By esterifying a PVA polymer (A) with a carboxylic acid having an unsaturated double bond or a salt thereof, a PVA polymer (B) having a double bond in its side chain is obtained. The amount of modification with the carboxylic acid having an unsaturated double bond or a salt thereof can be measured by, for example, a method in which the PVA polymer (B) is dissolved in a d6-DMSO solvent, which is measured by 1H-NMR and thereby the signal derived from the double bond is analyzed, or a method in which unreacted carboxylic acid is measured and determined by high performance liquid chromatography.

In the present invention, with respect to the PVA polymer (B) and PVA polymer (C), the amount of modification with the carboxylic acid or a salt thereof introduced through esterification is preferably 0.01 to 50 mol %, more preferably 0.01 to 25 mol %, further preferably 0.02 to 20 mol %, and particularly preferably 0.05 to 15 mol % with respect to monomer units of the PVA polymer (A).

In the present invention, when the PVA polymer (B) is a PVA polymer obtained by esterifying the PVA polymer (A) with unsaturated dicarboxylic acids or when the PVA polymer (C) is a PVA polymer obtained by esterifying the PVA polymer (A) with dicarboxylic acids or tricarboxylic acids, in order to improve the water solubility thereof, the carboxyl group that is not involved in the ester bond is reacted suitably with any one of hydroxides of monovalent to trivalent metals, salts, alkoxide, ammonia, ammonium salt, amine salt, and amine salts.

The PVA polymer (B) or PVA polymer (C) is used suitably, as a dispersion stabilizer for suspension polymerization, particularly for suspension polymerization of a vinyl compound. Examples of the vinyl compound include: vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; styrene, acrylonitrile, vinylidene chloride, and vinyl ether. Among these, particularly suitably, vinyl chloride is used independently or vinyl chloride and monomers capable of copolymerizing with vinyl chloride are used together in suspension polymerization. Examples of the monomers capable of copolymerizing with vinyl chloride include: vinyl esters such as vinyl acetate and vinyl propionate; (meth) acrylic acid esters such as methyl (meth)acrylate and ethyl (meth)acrylate; alpha-olefins such as ethylene and propylene; unsaturated dicarboxylic acids such as maleic anhydride and itaconic acid; acrylonitrile, styrene, vinylidene chloride, and vinyl ether.

For suspension polymerization of a vinyl compound, an oil soluble or water soluble polymerization initiator can be used that is used conventionally for polymerization of, for example, vinyl chloride monomers. Examples of the oil soluble polymerization initiator include: percarbonate compounds such as diisopropyl peroxydicarbonate, di-2-ethylhexyl peroxydicarbonate, and diethoxyethyl peroxydicarbonate; perester compounds such as t-butyl peroxyneodecanate, t-butylperoxypyvalate, t-hexylperoxypyvalate, and alpha-cumyl peroxyneodecanate; peroxides such as acetyl cyclohexyl sulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile and azobis(4-2,4-dimethylvaleronitrile). Examples of the water soluble polymerization initiator include potassium persulfate, ammonium persulfate, hydrogen peroxide, and cumene hydroperoxide. These oil soluble or water soluble polymerization initiators can be used independently, or two or more of them can be used in combination.

In the suspension polymerization of a vinyl compound, other various additives can be added to the polymerization reaction system as required. Examples of the additives include polymerization regulators such as aldehydes, halogenated hydrocarbons, and mercaptans, and polymerization inhibitors such as phenol compounds, sulfur compounds, and N-oxide compounds. Furthermore, a pH adjuster and a crosslinker also can be added optionally.

In suspension polymerization of a vinyl compound, the polymerization temperature is not particularly limited and can be adjusted to not only a lower temperature of around 20° C. but also a higher temperature exceeding 90° C. Furthermore, one of preferred embodiments also includes the use of a polymerizer equipped with a reflux condenser in order to improve the heat removal efficiency of the polymerization reaction system.

When the PVA polymer (B) or PVA polymer (C) is used as a dispersion stabilizer for emulsion polymerization, the amount thereof to be used is not particularly limited. It is used preferably in the range of 1 to 20 parts by weight, more preferably 2 to 15 parts by weight, and particularly preferably 3 to 13 parts by weight in terms of solid content with respect to 100 parts by weight of unsaturated monomers that is used for emulsion polymerization. When the PVA polymer (B) is used as the dispersion stabilizer in an amount within the aforementioned range, polymerization stability further improves.

Examples of the unsaturated monomers include: olefins such as ethylene, propylene, and isobutylene; halogenated olefins such as vinyl chloride, vinyl fluoride, vinylidene chloride, and vinylidene fluoride; vinyl esters such as vinyl formate, vinyl acetate, vinyl propionate, and vinyl versatate; acrylic acid, methacrylic acid, acrylic acid esters such as methyl acrylate, ethyl acrylate, butyl acrylate, 2-ethylhexyl acrylate, dodecyl acrylate, and 2-hydroxyethyl acrylate; methacrylic acid esters such as methyl methacrylate, ethyl methacrylate, butyl methacrylate, 2-ethylhexyl methacrylate, dodecyl methacrylate, and 2-hydroxyethyl methacrylate; dimethylaminoethyl acrylate, dimethylaminoethyl methacrylate, and quaternized products thereof. Further examples thereof include: acrylamide monomers such as acrylamide, methacrylamide, N-methylolacrylamide, N,N-dimethylacrylamide, acrylamide-2-methylpropanesulfonic acid, and sodium salts thereof; styrene monomers such as styrene, alpha-methylstyrene, p-styrenesulfonic acid, as well as sodium and potassium salt; N-vinylpyrrolidone; and diene monomers such as butadiene, isoprene, and chloroprene. These unsaturated monomers can be used independently, or two or more of them can be used in combination. Examples of preferable polymer of unsaturated monomers include polyvinyl acetate, an ethylene-vinyl acetate copolymer, and a (meth)acrylic acid ester (co)polymer.

Additives such as a preservative, a fungicide, an antiblocking agent, and an antifoamer that are used commonly for suspension polymerization and emulsion polymerization can be added to a dispersion stabilizer composed of the PVA polymer (B) or PVA polymer (C) of the present invention as required.

When the dispersion stabilizer of the present invention is used for suspension polymerization or emulsion polymerization, the dispersion stabilizer may be used independently but can be used together with water-soluble cellulose ether such as methylcellulose, hydroxyethylcellulose, hydroxypropylcellulose, or hydroxypropyl methylcellulose; a water-soluble polymer such as polyvinyl alcohol or gelatin; an oil-soluble emulsifier such as sorbitan monolaurate, sorbitan trioleate, glycerol tristearate, or an ethylene oxide/propylene oxide block copolymer; or a water-soluble emulsifier such as polyoxyethylene sorbitan monolaurate, polyoxyethylene glycerol oleate, or sodium laurate.

Furthermore, when the dispersion stabilizer of the present invention is used for suspension polymerization, a water-soluble or water-dispersible dispersion stabilizing aid can be used together. A dispersion stabilizing aid that is used suitably is a partially saponified PVA with a saponification degree of lower than 65 mol % and a polymerization degree of 50 to 750 and preferably with a saponification degree of 30 to 60 mol % and a polymerization degree of 180 to 650. Moreover, the dispersion stabilizing aid may be one provided with self-emulsifiability through introduction of an ionic group such as carboxylic acid or sulfonic acid.

The weight ratio (dispersion stabilizer/dispersion stabilizing aid) between the dispersion stabilizer and the dispersion stabilizing aid that are added when the dispersion stabilizing aid is used together cannot be specified uniformly since it varies according to, for example, the type of the dispersion stabilizer to be used. However, the weight ratio is preferably in the range of 95/5 to 20/80 and particularly preferably 90/10 to 30/70. The dispersion stabilizer and the dispersion stabilizing aid may be introduced together in the early stage of polymerization or may be introduced in fractional amounts in the middle of polymerization.

EXAMPLE

Hereinafter, the present invention is described in further detail using examples. In the following examples and comparative examples, "parts" and "%" denote "parts by weight" and "wt %", respectively, unless otherwise specified.

Example 1

Method of Synthesizing/Heat-Treating PVA Polymer (B)

After 100 parts by weight of the powdered PVA polymer (A) with a polymerization degree of 700 and a saponification degree of 70 mol % was added to a solution in which 5 parts by weight of fumaric acid had been dissolved in 200 parts by weight of methanol and was then allowed to swell, it was dried under reduced pressure at a temperature of 40° C. for 24 hours. Subsequently, this was heat-treated under a nitrogen atmosphere at 130° C. for one hour and was then subjected to Soxhlet washing using tetrahydrofuran (THF). Thus a PVA polymer (B) was obtained. This PVA polymer (B) was dissolved in a d6-DMSO solvent and was then subjected to 1H-NMR measurement. As a result, a signal derived from a double bond was observed at 6.5 ppm. The amount of modification of the PVA polymer (B) with the carboxylic acid was 0.5 mol %. Furthermore, the amount of alkali metal ions contained in the resultant PVA polymer (B) was measured by the atomic absorption method. As a result, sodium ions that seemed to be derived from a saponification by-product were observed and the amount thereof was 1.5 wt % in terms of sodium acetate.

<Suspension Polymerization of Vinyl Chloride>

The PVA polymer (B) obtained above was dissolved in deionized water in an amount equivalent to 600 ppm with respect to vinyl chloride and thereby a dispersion stabilizer was prepared. Then 1150 g of dispersion stabilizer thus obtained was introduced into a glass-lined autoclave with a volume of 5 L. Subsequently, 1.5 g of 70% solution of diisopropyl peroxydicarbonate in toluene was introduced into the glass-lined autoclave. Oxygen was then removed through deaeration carried out until the pressure inside the autoclave was reduced to 0.0067 MPa. Thereafter, 1000 g of vinyl chloride was introduced, the temperature of the content inside the autoclave was increased to 57° C., and polymerization was then started under stirring. The pressure inside the autoclave at the start of polymerization was 0.83 MPa. At the time when seven hours had elapsed after the start of polymerization and the pressure inside the autoclave had reached 0.44 MPa, polymerization was stopped, and unreacted vinyl chloride was removed. Thereafter, the polymerization slurry was taken out and was dried overnight at 65° C. Thus, vinyl chloride polymer particles were obtained.

<Evaluation of Vinyl Chloride Polymer Particles>

With respect to the vinyl chloride polymer particles, the average particle diameter, particle size distribution, and scale adhesion amount were measured according to the following methods. Table 1 indicates the evaluation results.

(1) Average Particle Diameter of Vinyl Chloride Polymer Particles

A metal mesh of Tyler mesh standard was used to measure the particle size distribution by dry sieve analysis and the average particle diameter was then determined.

(2) Particle Size Distribution of Vinyl Chloride Polymer Particles

The content retained on a 42-mesh JIS standard sieve was indicated in wt %. The smaller the number, the smaller the amount of coarse particles and the sharper the particle size distribution, which indicates excellent polymerization stability.

(3) Scale Adhesion Amount

After the polymer slurry had been removed from the polymerization tank, the adhesion state of scale on the inner wall of the polymerization tank was observed visually and was evaluated according to the following criteria:

⊚: Scale had hardly adhered,
○: Some scale had adhered, and
x: White scale had adhered considerably.

Examples 2 to 12

Using a PVA polymer (B) synthesized in the same manner as in Example 1 except that the PVA polymer (A) and carboxylic acid indicated in Table 1 were used and the heat treatment was carried out under the conditions indicated in Table 1, suspension polymerization of vinyl chloride was carried out in the same manner as in Example 1. Thus, vinyl chloride polymer particles were obtained. Table 1 indicates the evaluation results of the vinyl chloride polymer particles.

Comparative Example 1

Powder of the PVA polymer (A) was used directly as a dispersion stabilizer, and the suspension polymerization of vinyl chloride was carried out in the same manner as in Example 1. However, polymerization was not possible due to blocking of vinyl chloride. Thus, vinyl chloride polymer particles were not obtained.

Comparative Examples 2 and 3

A PVA polymer was synthesized in the same manner as in Example 1 except that powder of the PVA polymer (A) indicated in Table 1 was added to a methanol solution free from fumaric acid and this was heat-treated. Using this, suspension polymerization of vinyl chloride was carried out in the same manner as in Example 1. Thus, vinyl chloride polymer particles were obtained. Table 1 indicates the evaluation results. Coarse particles were contained and uniform polymer particles were not obtained. Furthermore, a large amount of scale had adhered and thus polymerization was not carried out stably.

Comparative Example 4

Suspension polymerization of vinyl chloride was carried out in the same manner as in Example 1 except that no heat treatment was carried out. However, polymerization was not possible due to blocking of vinyl chloride. Thus, vinyl chloride polymer particles were not obtained.

Example 13

Method of Synthesizing/Heat-Treating PVA Polymer (C)

After 100 parts by weight of the powdered PVA polymer (A) with a polymerization degree of 750 and a saponification degree of 72 mol % was added to a solution in which 5 parts by weight of malonic acid had been dissolved in 200 parts by weight of methanol and was then allowed to swell, it was dried under reduced pressure at a temperature of 40° C. for 24 hours. Subsequently, this was heat-treated under a nitrogen atmosphere at 140° C. for two hours and was then subjected to Soxhlet washing using tetrahydrofuran (THF). Thus, a PVA polymer (C) was obtained. The amount of modification of the PVA polymer (C) with the carboxylic acid was 0.8 mol %. Furthermore, the amount of alkali metal ions contained in the resultant PVA polymer (C) was measured by the atomic absorption method. As a result, sodium ions that seemed to be derived from a saponification by-product were observed and the amount thereof was 0.5 wt % in terms of sodium acetate.

<Suspension Polymerization of Vinyl Chloride>

The PVA polymer (C) obtained above was dissolved in deionized water in an amount equivalent to 800 ppm with respect to vinyl chloride and thereby a dispersion stabilizer was prepared. Then 1150 g of dispersion stabilizer thus obtained was introduced into a glass-lined autoclave with a volume of 5 L. Subsequently, 1.5 g of 70% solution of diisopropyl peroxydicarbonate in toluene was introduced into the glass-lined autoclave. Oxygen was then removed through deaeration carried out until the pressure inside the autoclave was reduced to 0.0067 MPa. Thereafter, 1000 g of vinyl chloride was introduced, the temperature of the content inside the autoclave was increased to 57° C., and polymerization was then started under stirring. The pressure inside the autoclave at the start of polymerization was 0.83 MPa. At the time when seven hours had elapsed after the start of polymerization and the pressure inside the autoclave had reached 0.44 MPa, polymerization was stopped, and unreacted vinyl chloride was removed. Thereafter, the polymerization slurry was taken out and was dried overnight at 65° C. Thus, vinyl chloride polymer particles were obtained.

Examples 14 to 20

Using a PVA polymer (C) synthesized in the same manner as in Example 13 except that the PVA polymer (A) and carboxylic acid indicated in Table 1 were used and heat treatment was carried out under the conditions indicated in Table 1, suspension polymerization of vinyl chloride was carried out in the same manner as in Example 13. Thus, vinyl chloride polymer particles were obtained. Table 1 indicates the evaluation results of the vinyl chloride polymer particles.

Comparative Example 5

Suspension polymerization of vinyl chloride was carried out in the same manner as in Example 13 except that no heat treatment was carried out. However, polymerization was not possible due to blocking of vinyl chloride. Thus, vinyl chloride polymer particles were not obtained.

TABLE 1

| | PVA(A) | | | Conditions for heat treatment | | | Vinyl chloride polymer | | | |
|---|---|---|---|---|---|---|---|---|---|---|
| | Polymerization degree | Saponification degree mol % | Sodium content[2] wt % | Temperature ° C. | Time hr | Carboxylic acid[1] | Modification amount mol % | Average particle diameter μm | Particle size distribution % | Scale adhesion |
| Ex. 1 | 700 | 70 | 1.5 | 130 | 1 | Fumaric acid(5) | 0.5 | 137 | 0.0 | ◎ |
| Ex. 2 | 700 | 70 | 1.5 | 130 | 1 | Maleic acid(2) | 0.4 | 140 | 0.0 | ◎ |
| Ex. 3 | 700 | 70 | 1.5 | 130 | 1 | Acrylic acid(5) | 1.2 | 158 | 0.0 | ◎ |
| Ex. 4 | 700 | 70 | 1.5 | 130 | 1 | Crotonic acid(5) | 1.0 | 153 | 0.0 | ◎ |
| Ex. 5 | 700 | 60 | 1.5 | 130 | 1.5 | Fumaric acid(5) | 0.5 | 165 | 1.0 | ◎ |
| Ex. 6 | 2000 | 80 | 0.5 | 130 | 1 | Fumaric acid(1) | 0.3 | 134 | 0.0 | ◎ |
| Ex. 7 | 700 | 70 | 1.5 | 100 | 1 | Maleic acid(0.1) | 0.005 | 190 | 3.0 | ○ |

TABLE 1-continued

| | Conditions for PVA(A) | | | heat treatment | | | Vinyl chloride polymer | | | |
|---|---|---|---|---|---|---|---|---|---|---|
| | Polymerization degree | Saponification degree mol % | Sodium content[2] wt % | Temperature ° C. | Time hr | Carboxylic acid[1] | Modification amount mol % | Average particle diameter μm | Particle size distribution % | Scale adhesion |
| Ex. 8 | 700 | 70 | 1.5 | 130 | 2 | Maleic acid(20) | 5.0 | 122 | 2.0 | ○ |
| Ex. 9 | 700 | 70 | 1.5 | 130 | 2 | Maleic acid(50) | 12.0 | 112 | 2.0 | ○ |
| Ex. 10 | 700 | 70 | 3.5 | 130 | 2 | Maleic acid(100) | 30.0 | 188 | 3.0 | ○ |
| Ex. 11 | 700 | 70 | 0.5 | 120 | 4 | Itaconic acid(1) | 0.2 | 140 | 0.0 | ◎ |
| Ex. 12 | 2000 | 80 | 0.5 | 80 | 2 | Maleic Anhydride(1) | 0.4 | 135 | 0.0 | ◎ |
| C. Ex. 1 | 700 | 70 | 1.5 | None | None | — | — | Polymerization was not possible due to blocking | | |
| C. Ex. 2 | 700 | 70 | 1.5 | 130 | 1 | — | — | 256 | 10.0 | X |
| C. Ex. 3 | 2000 | 80 | 0.5 | 130 | 1 | — | — | 177 | 5.0 | X |
| C. Ex. 4 | 700 | 70 | 1.5 | None | None | Fumaric acid(5) | — | Polymerization was not possible due to blocking | | |
| Ex. 13 | 750 | 72 | 0.5 | 140 | 2 | Malonic acid(5) | 0.8 | 165 | 0.0 | ◎ |
| Ex. 14 | 750 | 72 | 0.5 | 140 | 2 | Adipic acid(5) | 0.6 | 162 | 0.0 | ◎ |
| Ex. 15 | 750 | 72 | 0.5 | 140 | 2 | Propionic acid(5) | 0.5 | 187 | 2.0 | ○ |
| Ex. 16 | 750 | 72 | 0.5 | 140 | 4 | Adipic acid(50) | 10.5 | 151 | 0.5 | ◎ |
| Ex. 17 | 750 | 72 | 0.5 | 140 | 4 | Adipic acid(100) | 26.0 | 172 | 1.0 | ○ |
| Ex. 18 | 750 | 72 | 0.5 | 100 | 2 | Adipic acid(0.5) | 0.005 | 182 | 1.2 | ○ |
| Ex. 19 | 2400 | 80 | 0.2 | 140 | 2 | Adipic acid(10) | 1.4 | 143 | 0.0 | ◎ |
| Ex. 20 | 2400 | 80 | 0.2 | 140 | 2 | Phthalic acid(10) | 1.0 | 153 | 0.0 | ◎ |
| C. Ex. 5 | 750 | 72 | 0.5 | None | None | Malonic acid(5) | — | Polymerization was not possible due to blocking | | |

[1]The number indicated in parenthesis denotes the amount (parts by weight) mixed with respect to 100 parts by weight of PVA (A)
[2]In terms of sodium acetate

Example 21

Method of Synthesizing/Melting and Kneading PVA Polymer (B)

With respect to 100 parts by weight of the powdered PVA polymer (A) with a polymerization degree of 500 and a saponification degree of 74 mol %, 1 part by weight of fumaric acid was dry-blended. This was melted and kneaded at a temperature of 203° C. for two minutes using a Labo Prastomill. The kneaded mixture was subjected to Soxhlet washing using THF. Thus, a PVA polymer (B) was obtained. The PVA polymer (B) was dissolved in a d6-DMSO solvent and was then subjected to 1H-NMR measurement. As a result, a signal derived from a double bond was observed at 6.5 ppm. The amount of modification of the PVA polymer (B) with the carboxylic acid was 0.5 mol %.
<Suspension Polymerization of Vinyl Chloride>

Suspension polymerization of vinyl chloride was carried out in the same manner as in Example 1. The resultant vinyl chloride polymer particles were evaluated in the same manner as in Example 1. Table 2 indicates the evaluation results.

Examples 22 to 23

Using a PVA polymer (B) synthesized in the same manner as in Example 21 except that carboxylic acid indicated in Table 2 was used and the heat treatment was carried out under the conditions indicated in Table 2, suspension polymerization of vinyl chloride was carried out in the same manner as in Example 1. Thus, vinyl chloride polymer particles were obtained. Table 2 indicates the evaluation results of the vinyl chloride polymer particles.

Comparative Example 6

Using a PVA polymer (B) synthesized in the same manner as in Example 21 except that fumaric acid was not dry-blended and melting and kneading were carried out under the conditions indicated in Table 2, suspension polymerization of vinyl chloride was carried out in the same manner as in Example 1. However, polymerization was not possible due to blocking of vinyl chloride. Thus, vinyl chloride polymer particles were not obtained.

Example 24

Method of Synthesizing/Melting and Kneading PVA Polymer (C)

With respect to 100 parts by weight of the powdered PVA polymer (A) with a polymerization degree of 550 and a saponification degree of 74 mol %, 1 part by weight of glutaric acid was dry-blended. This was melted and kneaded at a temperature of 200° C. for two minutes using a Labo Prastomill. The kneaded mixture was subjected to Soxhlet washing using THF. Thus, a PVA polymer (C) was obtained. The amount of modification of the PVA polymer (C) with the carboxylic acid was 0.5 mol %.

<Suspension Polymerization of Vinyl Chloride>

Suspension polymerization of vinyl chloride was carried out in the same manner as in Example 13. The resultant vinyl chloride polymer particles were evaluated in the same manner as in Example 13. Table 2 indicates the evaluation results.

Example 25

Using a PVA polymer (C) synthesized in the same manner as in Example 24 except that 1 part by weight of adipic acid was used instead of 1 part by weight of glutaric acid and the heat treatment was carried out under the conditions indicated in Table 2, suspension polymerization of vinyl chloride was carried out in the same manner as in Example 11. Thus, vinyl chloride polymer particles were obtained. Table 2 indicates the evaluation results of the vinyl chloride polymer particles.

merization was completed. Thus, a polyvinyl acetate resin emulsion with a solid content concentration of 48% was obtained. The emulsion thus obtained was filtered with a 200-mesh metal mesh made of stainless steel. As a result, the amount of filtration residue was small, specifically 0.1% (solid content), and the stability during polymerization also was very good. Table 3 indicates the results.

Examples 27 to 28

Using a PVA polymer (B) synthesized in the same manner as in Example 26 except that carboxylic acid indicated in Table 3 was used, emulsion polymerization of vinyl acetate was carried out in the same manner as in Example 26. Thus, a polyvinyl acetate resin emulsion was obtained. The emulsion thus obtained was filtered with a 200-mesh metal mesh made of stainless steel. As a result, the amount of filtration residue was small, specifically 0.2% (solid content), and the stability during polymerization also was very good. Table 3 indicates the results.

TABLE 2

| | PVA(A) | | | Conditions for melting and kneading | | | Modification | Vinyl chloride polymer | | |
|---|---|---|---|---|---|---|---|---|---|---|
| | Polymerization degree | Saponification degree mol % | Sodium content[2] wt % | Temperature ° C. | Time min | Carboxylic acid[1] | amount mol % | Average particle diameter μm | Particle size distribution % | Scale adhesion amount |
| Ex. 21 | 500 | 74 | 1.2 | 203 | 2 | Fumaric acid(1.5) | 0.5 | 152 | 0.0 | ◎ |
| Ex. 22 | 500 | 74 | 1.2 | 195 | 2 | Maleic acid(0.5) | 0.2 | 149 | 0.0 | ◎ |
| Ex. 23 | 500 | 74 | 1.2 | 195 | 2 | Itaconic acid(1) | 0.4 | 145 | 0.0 | ◎ |
| C. Ex. 6 | 500 | 74 | 1.2 | 210 | 2 | — | — | Polymerization was not possible due to blocking | | |
| Ex. 24 | 550 | 74 | 0.6 | 200 | 2 | Glutaric acid(1.5) | 0.5 | 152 | 0.0 | ◎ |
| Ex. 25 | 550 | 74 | 0.6 | 198 | 2 | Adipic acid(1.5) | 0.4 | 149 | 0.0 | ◎ |

[1]The number indicated in parenthesis denotes the amount (parts by weight) mixed with respect to 100 parts by weight of PVA (A)
[2]In terms of sodium acetate Example 26

Method of Synthesizing/Heat-Treating PVA Polymer (B)

A PVA polymer (B) was synthesized in the same manner as in Example 1 except that powdered PVA polymer (A) with a polymerization degree of 1700 and a saponification degree of 98.5 mol % was used, 1 part by weight of fumaric acid was used as carboxylic acid having an unsaturated double bond, and heat treatment was carried out under the conditions indicated in Table 3.

<Emulsion Polymerization of Vinyl Acetate>

After 312 g of PVA polymer (B) whose concentration had been adjusted to 2.5% was introduced into a glass reactor with a volume of 1 L that was equipped with a stirrer, a reflux condenser, a dropping funnel, a nitrogen introducing tube, and a thermometer and the temperature thereof was adjusted to 60° C., 26 g of vinyl acetate and 15 g of 20% aqueous solution of sodium tartrate were introduced. The atmosphere inside the system was then replaced by nitrogen. While the content of the reactor was stirred at 200 rpm, 30 g of 5% hydrogen peroxide solution was dropped continuously over 2.5 hours and thereby polymerization was carried out. Completion of initial polymerization was confirmed 30 minutes after the start of polymerization. Further, 234 g of vinyl acetate was added continuously over two hours and the poly- Example 29

Using a PVA polymer (B) synthesized in the same manner as in Example 23 except that PVA with a polymerization degree of 1700, a saponification degree of 98.5 mol %, and a 1,2-glycol bond content of 2.2 mol % was used as the PVA polymer (A), emulsion polymerization of vinyl acetate was carried out in the same manner as in Example 26. Thus, a polyvinyl acetate resin emulsion was obtained. The emulsion thus obtained was filtered with a 200-mesh metal mesh made of stainless steel. As a result, the amount of filtration residue was small, specifically 0.05% (solid content), and the stability during polymerization also was very good. Table 3 indicates the results.

Comparative Example 7

Using a PVA polymer (B) synthesized in the same manner as in Example 26 except that fumaric acid was not used, emulsion polymerization of vinyl acetate was carried out in the same manner as in Example 26. Thus, a polyvinyl acetate resin emulsion was obtained. The emulsion thus obtained was filtered with a 200-mesh metal mesh made of stainless steel. As a result, the amount of filtration residue was 20% (solid content), and it was not possible to perform the emulsion polymerization stably. Table 3 indicates the results.

Example 30

Method of Synthesizing/Heat-Treating PVA Polymer (C)

A PVA polymer (C) was synthesized in the same manner as in Example 13 except that powdered PVA polymer (A) with a polymerization degree of 1700 and a saponification degree of 98.5 mol % was used, 1 part by weight of malonic acid was used as carboxylic acid, and heat treatment was carried out under the conditions indicated in Table 3.

<Emulsion Polymerization of Vinyl Acetate>

After 312 g of PVA polymer (C) whose concentration had been adjusted to 2.5% was introduced into a glass reactor with a volume of 1 L that was equipped with a stirrer, a reflux condenser, a dropping funnel, a nitrogen introducing tube, and a thermometer and the temperature thereof was adjusted to 60° C., 26 g of vinyl acetate and 15 g of 20% aqueous solution of sodium tartrate were introduced. The atmosphere inside the system was then replaced by nitrogen. While the content of the reactor was stirred at 200 rpm, 30 g of 5% hydrogen peroxide solution was dropped continuously over 2.5 hours and thereby polymerization was carried out. Completion of initial polymerization was confirmed 30 minutes after the start of polymerization. Further, 234 g of vinyl acetate was added continuously over two hours and the polymerization was completed. Thus, a polyvinyl acetate resin emulsion with a solid content concentration of 48% was obtained. The emulsion thus obtained was filtered with a 200-mesh metal mesh made of stainless steel. As a result, the amount of filtration residue was small, specifically 0.2% (solid content), and the stability during polymerization also was very good. Table 3 indicates the results.

Example 31

Using a PVA polymer (C) synthesized in the same manner as in Example 30 except that adipic acid was used instead of malonic acid, emulsion polymerization of vinyl acetate was carried out in the same manner as in Example 30. Thus, a polyvinyl acetate resin emulsion was obtained. The emulsion thus obtained was filtered with a 200-mesh metal mesh made of stainless steel. As a result, the amount of filtration residue was small, specifically 0.3% (solid content), and the stability during polymerization also was very good. Table 3 indicates the results.

Example 32

Using a PVA polymer (C) synthesized in the same manner as in Example 30 except that PVA with a polymerization degree of 1700, a saponification degree of 98.5 mol %, and a 1,2-glycol bond content of 2.2 mol % was used as the PVA polymer (A) and adipic acid was used as carboxylic acid instead of malonic acid, emulsion polymerization of vinyl acetate was carried out in the same manner as in Example 30. Thus, a polyvinyl acetate resin emulsion was obtained. The emulsion thus obtained was filtered with a 200-mesh metal mesh made of stainless steel. As a result, the amount of filtration residue was small, specifically 0.03% (solid content), and the stability during polymerization also was very good. Table 3 indicates the results.

TABLE 3

| | PVA(A) | | | | Conditions for heat treatment | | | Modification | Vinyl acetate resin emulsion Amount of |
| --- | --- | --- | --- | --- | --- | --- | --- | --- | --- |
| | Polymerization degree | Saponification degree mol % | 1,2-Gly[2] mol % | Sodium content[3] wt % | Temperature °C. | Time hr | Carboxylic acid[1] | amount mol % | filtration residue % |
| Ex. 26 | 1700 | 98.5 | — | 0.3 | 130 | 1 | Fumaric acid(4) | 0.5 | 0.1 |
| Ex. 27 | 1700 | 98.5 | — | 0.3 | 130 | 1 | Maleic acid(3) | 0.7 | 0.2 |
| Ex. 28 | 1700 | 98.5 | — | 0.3 | 130 | 1 | Itaconic acid(2) | 0.3 | 0.1 |
| Ex. 29 | 1700 | 98.5 | 2.2 | 0.3 | 130 | 1 | Fumaric acid(4) | 0.5 | 0.05 |
| C. Ex. 7 | 1700 | 98.5 | — | 0.3 | 130 | 1 | — | — | 20.0 |
| Ex. 30 | 1700 | 98.5 | — | 0.1 | 140 | 1 | Malonic acid(5) | 0.8 | 0.2 |
| Ex. 31 | 1700 | 98.5 | — | 0.1 | 140 | 1 | Adipic acid(5) | 0.9 | 0.3 |
| Ex. 32 | 1700 | 98.5 | 2.2 | 0.1 | 140 | 1 | Adipic acid(5) | 1.2 | 0.03 |

[1]The number indicated in parenthesis denotes the amount (parts by weight) mixed with respect to 100 parts by weight of PVA (A)
[2]The content of 1,2-glycol bonds
[3]In terms of sodium acetate The dispersion stabilizer of the present invention is excellent in polymerization stability when used in suspension polymerization. Accordingly, it reduces the blocking and scale adhesion that are caused by instable polymerization, and polymer particles with less coarse particles and a sharp particle size distribution can be obtained. When used in emulsion polymerization, it also is excellent in polymerization stability, and therefore a polymer with a less amount of filtration residue can be obtained. Thus, it is industrially very useful.

The invention claimed is:

1. A dispersion stabilizer comprising a polyvinyl alcohol polymer (B) comprising a double bond in its side chain,
    wherein said polymer (B) is obtained by esterifying a polyvinyl alcohol polymer (A) with a carboxylic acid, salt thereof, or combination thereof selected from the group consisting of fumaric acid, itaconic acid, a salt of fumaric acid, a salt of itaconic acid, and combinations thereof,
    wherein an amount of modification of the polymer (B) with the carboxylic acid, salt thereof, or combination thereof is from 0.05 to 0.5 mol % with respect to monomer units of the polymer (A).
2. The dispersion stabilizer according to claim 1, which is a dispersion stabilizer for suspension polymerization.

3. The dispersion stabilizer according to claim 1, which is a dispersion stabilizer for emulsion polymerization.

4. A method for suspension polymerization of a vinyl compound, the method comprising suspension polymerizing a vinyl compound in the presence of the dispersion stabilizer of claim 1.

5. A method for emulsion polymerization of a vinyl compound, the method comprising emulsion polymerizing a vinyl compound in the presence of the dispersion stabilizer of claim 1.

6. The dispersion stabilizer of claim 1, wherein the carboxylic acid, salt thereof, or combination thereof comprises fumaric acid.

7. The dispersion stabilizer of claim 1, wherein the carboxylic acid, salt thereof, or combination thereof comprises itaconic acid.

8. The dispersion stabilizer of claim 1, wherein the carboxylic acid, salt thereof, or combination thereof comprises the salt of fumaric acid.

9. The dispersion stabilizer of claim 1, wherein the carboxylic acid, salt thereof, or combination thereof comprises the salt of itaconic acid.

10. The dispersion stabilizer of claim 1, wherein the polymer (A) has a polymerization degree ranging from 700 to 2000.

11. The dispersion stabilizer of claim 1, wherein the polymer (A) has a saponification degree ranging from 60 mol % to 80 mol %.

12. The dispersion stabilizer of claim 10, wherein the polymer (A) has a saponification degree ranging from 60 mol % to 80 mol %.

13. The dispersion stabilizer of claim 1, wherein a sodium ion content of the polymer (A), in terms of sodium acetate, is selected from the group consisting of 0.5 wt % and 1.5 wt %.

14. The dispersion stabilizer of claim 10, wherein a sodium ion content of the polymer (A), in terms of sodium acetate, is selected from the group consisting of 0.5 wt % and 1.5 wt %.

15. The dispersion stabilizer of claim 12, wherein a sodium ion content of the polymer (A), in terms of sodium acetate, is selected from the group consisting of 0.5 wt % and 1.5 wt %.

16. The method of claim 4, wherein the vinyl compound comprises vinyl chloride.

17. The method of claim 5, wherein the vinyl compound comprises vinyl chloride.

18. The polymer dispersion of claim 1, wherein the carboxylic acid, salt thereof, or combination thereof is a combination of at least two of fumaric acid, itaconic acid, a salt of fumaric acid, and a salt of itaconic acid.

* * * * *